Figures 6, 7:
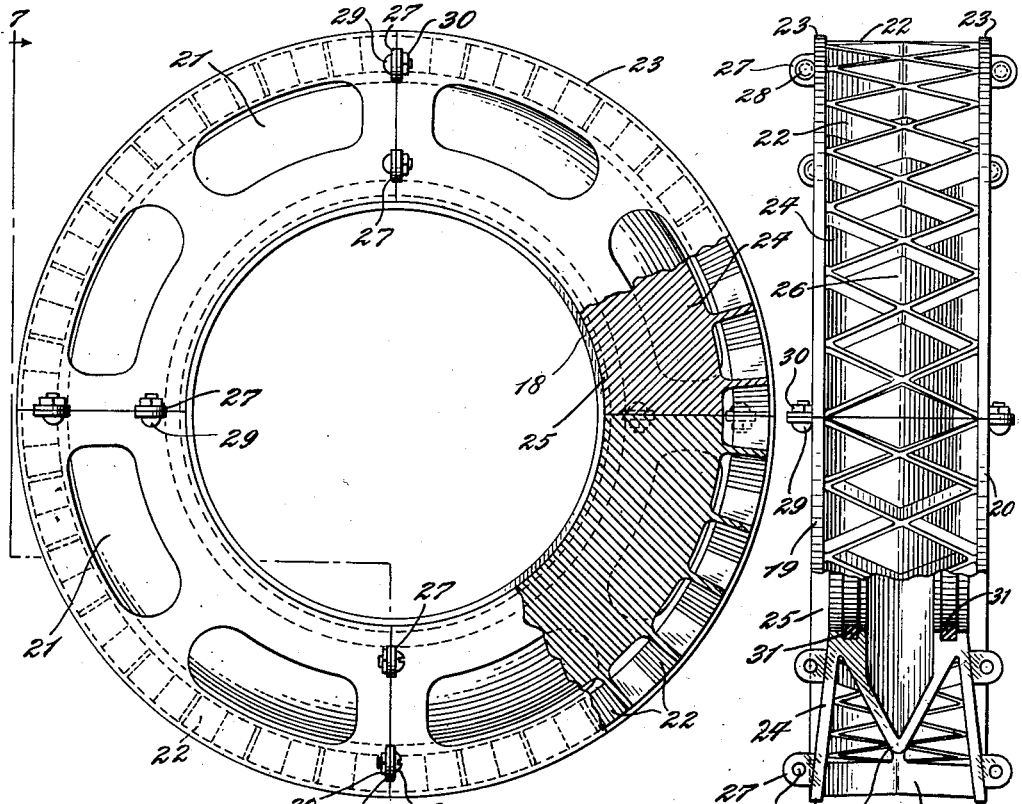

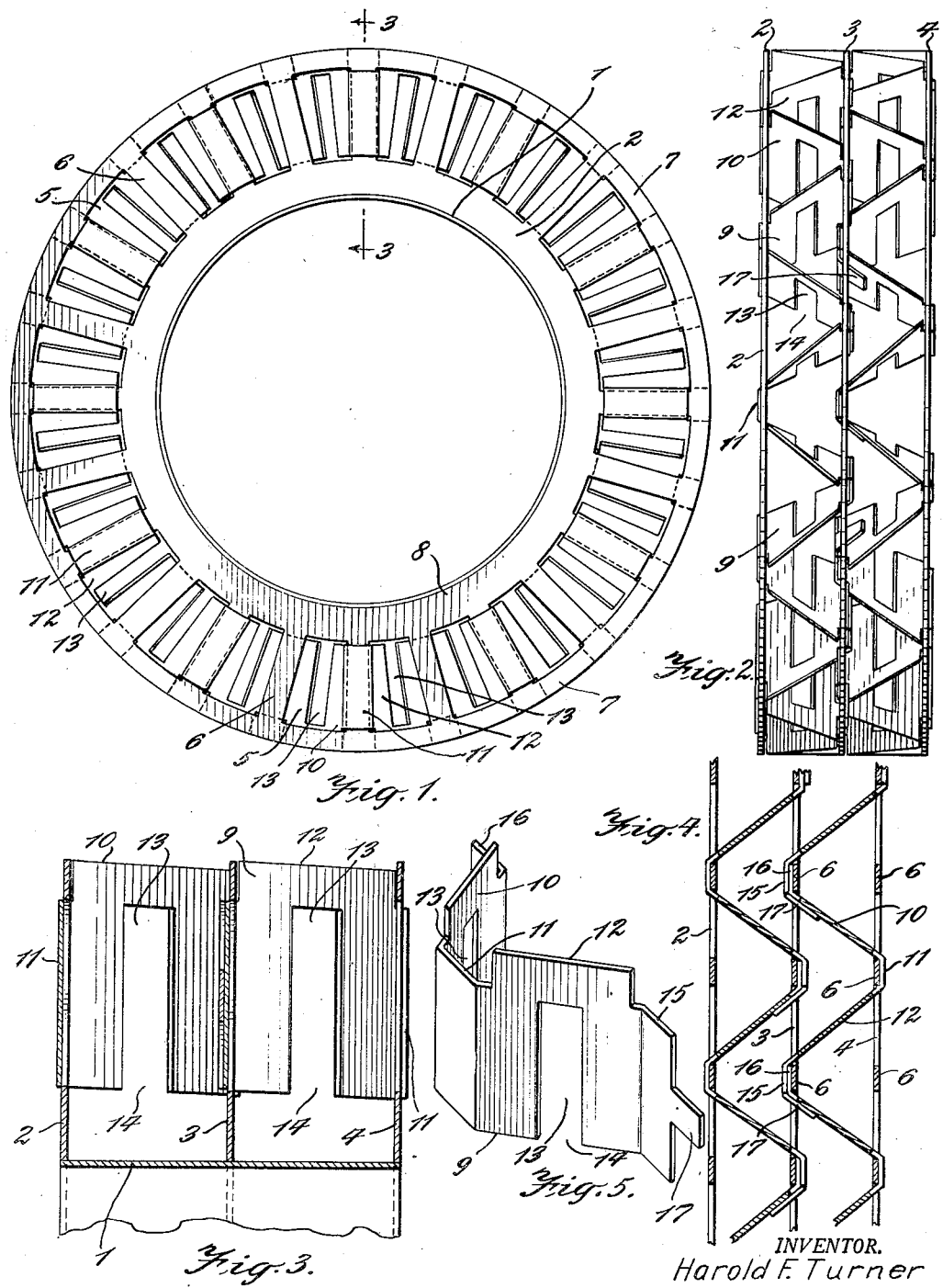
May 22, 1951     H. F. TURNER     2,554,392
TRACTION TIRE
Filed March 14, 1947     3 Sheets-Sheet 1
INVENTOR.
Harold F. Turner
BY
ATTORNEYS May 22, 1951     H. F. TURNER     2,554,392
TRACTION TIRE Filed March 14, 1947     3 Sheets-Sheet 2

INVENTOR.
Harold F. Turner
BY
Aickenbach & Hisselman
ATTORNEYS

May 22, 1951 — H. F. TURNER — 2,554,392

TRACTION TIRE

Filed March 14, 1947 — 3 Sheets-Sheet 3

INVENTOR.
Harold F. Turner
BY
Adkenbach & Hirselman
ATTORNEYS

Patented May 22, 1951

2,554,392

UNITED STATES PATENT OFFICE 2,554,392

TRACTION TIRE

Harold F. Turner, New York, N. Y.

Application March 14, 1947, Serial No. 734,698

5 Claims. (Cl. 301—40)

1

This invention relates to a tire and more particularly to a tire used in connection with farm tractors and other similar vehicles which travel over cultivated or soft and muddy terrain.

The use of flat band tires with lugs or grouters and of pneumatic tires with integral rubber cleats has proved inefficient in many respects. The very nature of much of the work performed by farm tractors, cultivators and the like necessitated the operation of these vehicles over soft, muddy ground as well as over soil which must be free from ruts and channels. Since the increased range of speed expanded the use of farm tractors into service for road haulage it has become common practice to employ pneumatic tires for both agrarian operations and highway travel despite the loss of power through slippage when plowing and the loss of topsoil through erosion resulting from rutting of fields. The packing or rutting of the soil by both pneumatic and flat band tires produces results which are directly antipathetic to the work for which farm vehicles are mainly employed. In order to reduce loss of power through slippage, the practice has been to weight the tractors for heavy pulling and thus, while tractive coefficient is increased, power is consumed by the added load. In many zones, where tractor power must be used for early spring plowing with the soil wet and soft or for road building, excavating and ditch digging, the farmer has had to employ another complete machine of the track-laying type.

It is therefore the main object of this invention to provide a tire suitable for farm tractors, cultivators, military vehicles and similar vehicles which is capable of supplying traction through farm and over muddy rough terrain.

Another object of this invention is to provide a tire which will reduce loss of topsoil from erosion by preventing soil rutting and still provide the traction needed for heavy pulling through loose soil.

Another object of this invention is to provide a tire which will perform much the same function as the implement for operation of which it provides movement. Thus, while the harrow is breaking up the soil for seeding, the tire is performing an identical function.

Another object of the invention is to improve the condition of the soil when used on a vehicle operating a seeder.

Another object of this invention is to provide a tire which, when used for cultivating, will loosen the soil between rows and deposit loose dirt onto the rows.

2

Still another object of this invention is to provide a tire which can be substituted for the standard pneumatic tire with no greater loss of time than the changing of one tire for the other.

A further object of this invention is to provide a tire which will give the wheeled tractor a tractive element comparable to that of the track-laying type, will be practically free from immobilization because of high flotation and tractive coefficient and will, in addition, break up soil clods and leave the soil open for moisture penetration.

Another object of this invention is to provide a tire made of demountable parts or segments which may be removed without special tools and repaired or replaced if any part or segment is damaged while operating the vehicle.

Still another object of this invention is to provide a tire which may be adapted for operation over either farm land or hard surfaced highways by simple addition of an outer road band of semi-resilient material.

Figure 8:
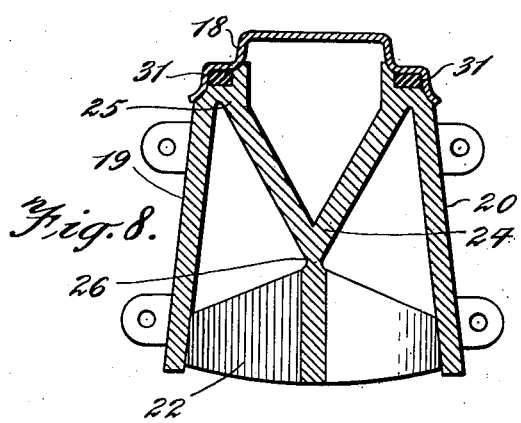
Figure 9:
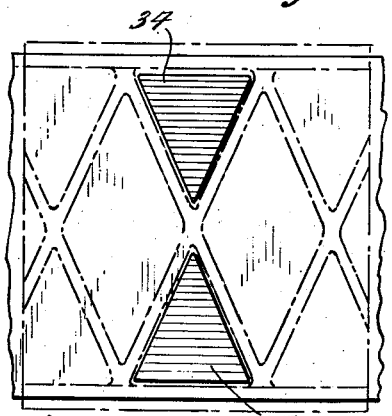
Figure 10:
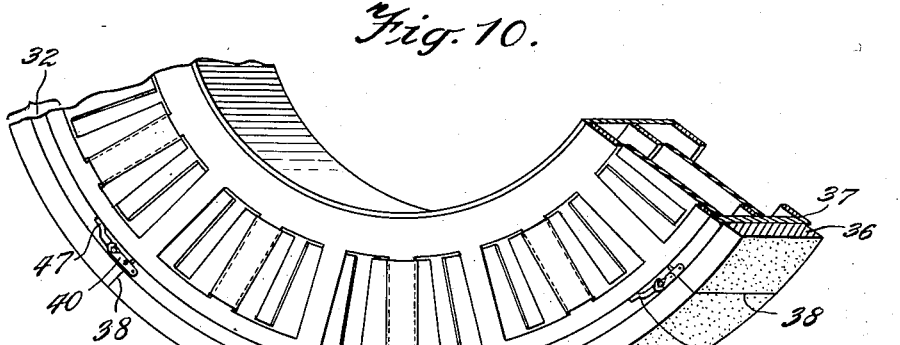
Figures 11, 12:
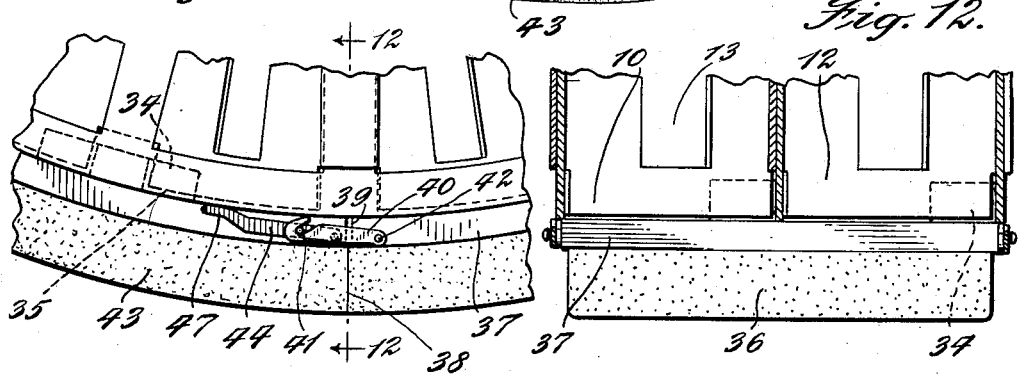
Figure 13:
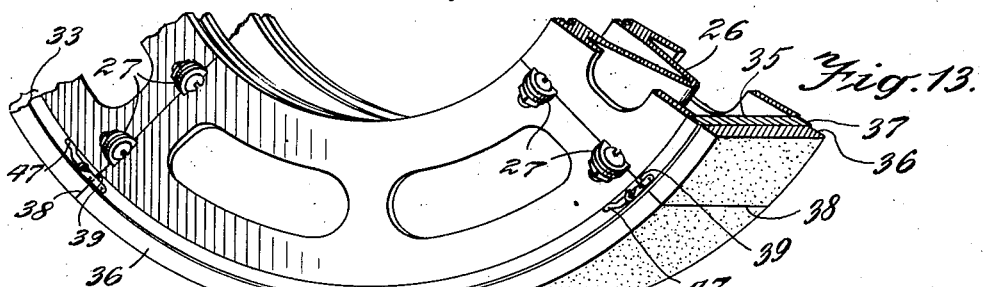
Figure 14:
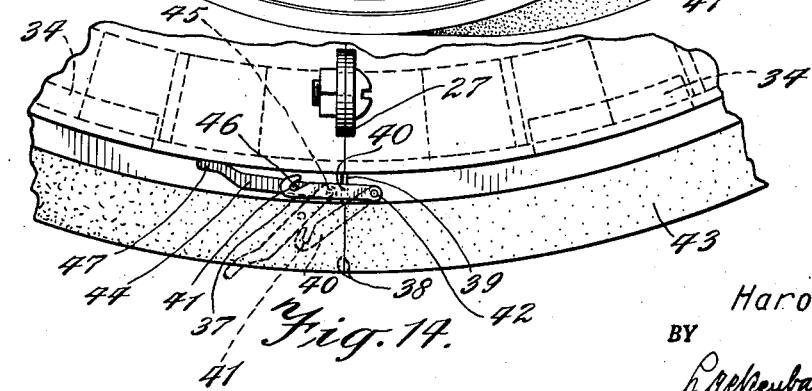

Other objects and advantages will appear from the following description considered in connection with the accompanying drawings, in which Fig. 1 is a side elevational view of the tire; Fig. 2 is an end elevational view of the tire shown in Fig. 1; Fig. 3 is a cross-sectional view of the tire of Fig. 1 taken along the line 3—3; Fig. 4 is a sectional view of the tire of Fig. 2 showing the method of connecting the removable paddle treads; Fig. 5 is a perspective view of a single removable paddle tread; Fig. 6 is a side elevational view of the tire made of cast segments, partly in section; Fig. 7 is an end view of Fig. 6 taken along the line 7—7, one part of line 7—7 being in cross-section; Fig. 8 is a sectional view of the tire of Fig. 6; Fig. 9 is an end view of Fig. 7 showing a position of the triangular blocks fitting snugly between two criss-cross paddle treads; Fig. 10 is a perspective view of a section of a road band adapted to fit the tire shown in Figs. 1 and 2; Fig. 11 shows the device for latching sections of the road band together when fitted to the tire shown in Figs. 1 and 2; Fig. 12 is a cross-sectional view of the road band fitted to the tire shown in Fig. 11 and taken along the lines 12—12; Fig. 13 is a perspective view of the road band section adapted to fit the tire shown in Figs. 6 and 7; Fig. 14 shows the device for latching the road band sections together when fitted to the tire shown in Figs. 6 and 7.

Referring now to the drawings and in particular to the tire shown in Figs. 1, 2, 3, 4 and 5, this tire comprises a rim 1 to which is welded three parallel discs 2, 3 and 4. Discs 2 and 4 are welded, respectively, to the outer and inner edges of the tire rim 1 while disc 3 is welded to th middle of rim 1 between discs 2 and 4. The three discs, 2, 3 and 4 are perforated by openings 5 equidistant from each other around the entire wall of each disc. The openings 5 are separated by ribs 6 which interconnect the outside edges 7 and the inside edges 8 of the discs 2, 3 and 4.

A paddle tread 9 is made of three sections 10, 11 and 12 with elongated rectangular cutouts 13 having open ends 14 which face in the same direction in sections 10 and 12. Said paddle tread 9 is formed in a "V" shape, slightly flattened at the base, sections 10 and 12 being the side walls of the "V" while section 11 makes the flattened base of said V. The end portion 15 of section 10 and the end portion 16 of section 12 of the paddle tread 9 are bent back slightly to round off the ends of the V shape end portion 15 of the paddle tread 9, which has a rectangular projecting tongue 17 extending from the center part of said end portion 15. This tongue 17 is long enough to be bent over and lock a portion 15 of one paddle tread 9 with the portion 16 of an adjacent paddle tread 9. Discs 2, 3 and 4 may be made, for example, of metal or nylon plastic or other material capable of sustaining loads and withstanding normal wear and tear. The paddle treads 9 may be made of any suitable metal or other material capable of being punched out and formed with the desired bends as described above.

Referring now to Figs. 6 and 7 of the drawings, another embodiment of the tire comprises two side walls 19 and 20 which have large perforations 21 arranged equidistantly around said side walls 19 and 20. Criss-cross tread strips 22 extend from the inner wall of side walls 19 to the opposite inner wall of side wall 20 with their under point of intersection connected with apex 26 of the V-shaped core. These criss-cross strips 22 are arranged around the circumference of the tire in such a fashion that said criss-cross strips 22 are not quite flush with the tread 23 of the side walls 19 and 20. V-shaped core 24 is located between the two side walls 19 and 20 with the tops 25 of the V connecting with side walls 19 and 20. Said core 24 is an integral part of side walls 19 and 20 and is arranged around the entire section of the tire with its apex 26 contacting the inner side of the criss-cross treads 22. A resilient insert 31 is arranged around the entire section of the tire on each side. This tire is constructed in sections which, for example, may be four in number. At the end of each segment are projecting ears 27 having central openings 28 bored to receive tightening bolts 29. These projecting ears 27 are so constructed that when all sections are assembled the ears 27 of one section will lie exactly adjacent to the ears 27 of the adjoining section. Bolts 29 and nuts 30 are used to tighten the sections together. Resilient inserts 31 are imbedded at the common base of side walls 19 and 20 and the tops 25 of the V-shaped core 24 and the rim 18.

Figs. 10 and 13 show the roadbands 32 and 33 which are applied to the periphery of the tires when operation on surfaced highways is desired. Triangular wedges 34 are mounted on the underside 35 of said roadbands 32 and 33 to conform to and fit into apertures between treads 10 and 12 of Figs. 1 and 2 and tread 22 of Fig. 6 of the respective tires. Fig. 9 of the drawings shows the position of the triangular wedges 34 as they are located between the criss-cross treads 22 of the tire shown in Fig. 6 and Fig. 7. When the resilient bands 32 or 33 are to be used in connection with the tire shown in Figs. 1 and 2, then these triangular wedges 34 are placed in a staggered position with the apex of said triangular wedges facing each other so that they fit within the apertures that exist between the paddle treads 9 of the aforementioned tire. Roadbands 32 and 33 comprise sections of semi-resilient material 36 permanently mounted on a metal base 37.

The ends of the semi-resilient material 36 extend slightly beyond the ends 39 of the metal base 37 for reasons which will be explained hereinafter. A latch 40 terminating at one end in a hook 41 is attached to the metal base 37 by means of a rivet 42 at the other end of said latch 40 which can be pivoted around said rivet 42. Attached to the other end of the segment 43 of the roadbands 32 and 33 is a latch 44 having an attaching pivotal rivet 45 around which said latch 44 may be rotated freely. Protruding from the midsection of said latch 44 is a stud 46 adapted to be engaged by the hook 41 of the latch 40. The latch 44 terminates in a handle 47 for easy manipulation of said latch 44.

The operation of the device is as follows: When using the tire containing the three perforated discs 2, 3 and 4 in connection with the paddle treads 9, the user can decide as to the number of paddle treads 9 he needs over a predetermined section of ground. The correct number of paddle treads 9 are inserted between the ribs 6 of the discs 2, 3 and 4 to form a herringbone tread pattern. Paddle treads 9 are attached by weaving the formed paddle tread 9 through an opening 5 between any two adjacent ribs 6 of disc 2 until the central section 11 of the paddle tread 9 rests against the outer wall of one rib 6. End sections 10 and 12 are then bent toward the adjacent disc 3 until its respective end portions 15 and 16 clamp around the nearest adjacent ribs 6 of said disc 3. The spring tension of the paddle tread 9 will hold it firmly between discs 2 and 3. In order to prevent loosening under severe jolts and stresses, the projecting tongue 17 is bent down and secured across the end portion 16. Damaged paddle treads 9 may be removed in a few minutes, straightened and sprung back into position or while the paddle treads 9 are removed, any damage to the discs 2, 3 and 4 may be corrected. Paddle treads may be inserted through the ribs 6 of the outer disc 2 or 4 and secured to ribs 6 of the inner disc 3 or the reverse may be done; i. e., the paddle tread 9 inserted through a rib 6 of the inner disc 3 and secured to ribs 6 of the outer discs 2 or 4. In addition, a road band 32, comprising sections 43 of semi-resilient material 36, and a metal base 37, is applied to the tire when this tire is to operate over improved highways.

This roadband 32 is attached in the following manner: Two identical segments 43 of the roadband 32 are arranged on the periphery of the tire so that the triangular wedges 34 situated on the underside 35 of said roadband 32 rest within the apertures existing between the treads 10, 12 and 22 of the respective tires. When said roadband sections 43 are arranged correctly, then a hooked latch 40 adjoins a handle latch 44. In order to tighten said roadband sections 43 to each other around said tire, the latch 40 is raised so that the hook 41 engages the protruding stud 46 of the adjoining latch 44. Then the handle 47 of latch 44 is raised, which action draws the two adjoining sections 43 together against the compression of the protruding ends 38 of the semi-resilient material 36. The tension exerted by the compressed semi-resilient material 36 holds the handle 47 of the latch 44 firmly against the tread of the metal tire so that it cannot loosen due to vibration or sudden shock. In addition, when said handle 47 is in the locked position, the stud 46 is above the pivotal point.

In the second embodiment, the tire provides for cast segments to be assembled into a unit and mounted onto a standard tractor rim. These segments may be any predetermined number. Each segment composed of the side walls 19 and 20, V-shaped core 24, resilient insert 31 approximating the "bead" on a pneumatic tire, and the crisscross treads 22 are joined to any other segment by means of the projecting ears 27 and pairs of bolts 29 and nuts 30 which fit in the openings 28 in said projecting ears 27. The correct number of segments is arranged around the rim of a wheel, as for instance, of a standard tractor and the adjacent ears 27 on adjoining segments are tightened to each other by means of the aforementioned bolts 29 and 30. Whereas the pneumatic tire depends upon expansion through inflation for its grip on the wheel rim 18, this metal tire relies upon the drawing up of the bolts 29 to compress the "bead" 31 to accomplish the same result. Damaged segment may be removed and replaced in the same manner. Here, too, road bands 33, as described above, may be applied to said tire when it is to be operated on surfaced highways, provided the particular roadband chosen has a predetermined triangular wedge situated on the inside in accordance with the description mentioned above.

As will be seen from the above descriptions, the invention discloses a tire for tractor work over farm land or other loose soil wherein good traction is provided without the attendant damages to farm land, such as rutting and soil packing which results from the use of the standard pneumatic tire with farm machinery.

This tire tread introduces a novel means for overcoming immobilization by decreasing resistance to motion and increasing traction for producing motion. Whereas it is common practice for the traction element to penetrate the soil and thus gain friction, this tire reverses that principle and provides for penetration of the tire by the soil, providing reduced resistance to movement and the breaking up of soil clods and leaves the soil open for moisture penetration. Furthermore, in cultivating row crops this tire picks up loose soil and ejects it through side wall apertures onto the rows.

In addition, this new tire may be easily assembled, mounted and demounted with standard tools. Sections of said tire may be removed for repair or to be discarded and replaced. Lighter tractors may be used with greater horsepower since the need for weighting the tractor for heavy pulling in soft ground is eliminated.

Operation over improved highways, going to and from work, is provided for through the means of semi-resilient road bands applied to the treads.

While, in disclosing the principles of my invention and its preferred embodiment, I have described various detailed structure and relationship, it will be understood that such embodiment and details are given by way of example only and not as limiting the scope of my invention.

I claim:

1. A tire comprising side walls, a V-shaped core having resilient inserts and paddle treads situated between said side walls and attached to the V-shaped core, said tire being divided into a plurality of segments and means for attaching said segments to each other.

2. A tire as set forth in claim 1, in which said V-shaped core consists of a base side and apex, the base of said core being an integral part of the section providing an M-shaped member with the side walls, and the apex of said core is connected with said paddle treads at its apex.

3. A tire as set forth in claim 1, in which said attaching means comprises a plurality of bored ears adapted to mate with the the cores of ears attached to adjoining segments of said tire and bolts and nuts adapted to tighten ears of one segment to ears of adjoining segments of said tire.

4. A tire as set forth in claim 1, in which a plurality of elongated perforations are cut in the side walls of said tire and said perforations being adapted to permit soil to escape from between said side walls when said core compresses the soil toward each side wall.

5. A tire as set forth in claim 1 in which said resilient inserts comprises a plurality of segments, means for attaching adjoining segments of said resilient inserts to each other and means for positioning said resilient inserts on the periphery of said tire.

HAROLD F. TURNER.

REFERENCES CITED

The following references are of record in the file of this patent:

UNITED STATES PATENTS

| Number | Name | Date |
|---|---|---|
| 1,932,267 | Francis | Oct. 24, 1933 |
| 1,373,530 | Schneider | Apr. 5, 1921 |